United States Patent [19]

Hirosaki

[11] Patent Number: 4,541,104
[45] Date of Patent: Sep. 10, 1985

[54] FRAMING CIRCUIT FOR DIGITAL SYSTEM
[75] Inventor: Botaro Hirosaki, Tokyo, Japan
[73] Assignee: NEC Corporation, Tokyo, Japan
[21] Appl. No.: 501,729
[22] Filed: Jun. 6, 1983
[30] Foreign Application Priority Data Jun. 10, 1982 [JP] Japan .................................. 57-99704
Jun. 10, 1982 [JP] Japan .................................. 57-99705

[51] Int. Cl.³ ............................................. H04L 7/08
[52] U.S. Cl. ...................................... 375/114; 370/105
[58] Field of Search ....................... 375/106, 113, 114;
370/100, 105, 106; 371/42, 46; 328/63, 72

[56] References Cited
U.S. PATENT DOCUMENTS 3,662,114  5/1972  Clark .................................... 370/106
4,016,368  4/1977  Apple, Jr. ........................... 370/105
4,214,124  7/1980  Jarus .................................... 375/114
4,301,534 11/1981  Genter ................................ 370/105

Primary Examiner—Robert L. Griffin
Assistant Examiner—Stephen Chin
Attorney, Agent, or Firm—Sughrue, Mion, Zinn, Macpeak & Seas

[57] ABSTRACT

A framing system processes a digital signal having a clock period of T seconds and a frame of which is made up of an n-bit framing pattern and m-bit information, (n+m) bits long in total. This system is applicable to a situation in which the probability that a pattern common to the n-bit framing pattern appears in the m-bit information is very low. With attention paid to the special characteristics of a frame pattern, when a coincidence pulse is found at a position different from the present frame position inside a window, the frame information is immediately regarded as being lost at that instant and the system is caused into a hunting state to search a new frame position.

3 Claims, 12 Drawing Figures

FRAMING CIRCUIT FOR DIGITAL SYSTEM

BACKGROUND OF THE INVENTION

The present invention relates to a framing system for digital signals having a frame made up of an n-bit framing pattern and m-bit information, n+m bits long in total, and a clock period of T seconds. More particularly, the present invention is concerned with a framing system applicable to a situation wherein the probability is very low that a same pattern as an n-bit framing pattern appears in m-bit information, i.e. a framing system of the unique word detection type.

A unique word detection type framing system is often required for systems in which the clock of received digital signals undergoes substantial phase fluctuation, such as satellite communication systems and digital audio systems.

A predominant system for the unique word detection type framing is one which employs a window for detection. A window or time slot is defined which extends to opposite sides of the position of a framing pulse which presently indicates a correct frame position. Every time a clock pulse appears, an n-bit long or shorter digital signal arrived up to that time is observed and whether or not the resulting observed pattern is coincident with a framing pattern is determined. If the two patterns are coincident, the frame position is immediately regarded as a new frame position at the instant of coincidence detection. If no coincidence pulse is found in the window and such a state repeats itself predetermined N times, the system immediately enters a hunting state to search a new frame position. The number of times, N, is the parameter which is generally referred to as the "frequency of forward protection".

This kind of prior art method is effective only when the autocorrelation function of the framing pattern is so sharp that the appearance of a coincidence pulse at a position deviated from the present frame position due to a random error caused by noise and the like is least probable. This will be cleared up by the following analysis.

Suppose that an n-bit framing pattern is $(a_1, a_2, \ldots, a_n)$ and this, in combination with information in the "k" and "k+1" frames, is being observed as a bit stream $$\ldots, b_{k,m-1}, b_{k,m}, a_1, a_2, \ldots, a_n, b_{k+1,1}, b_{k+1,2}, \ldots$$

In this instance, the probability that an n-bit pattern, e.g., $b_{k,m}, a_1, a_2, \ldots, a_{n-1}$, is incorrectly determined as the framing pattern $a_1, a_2, \ldots, a_n$ is expressed as $$P = p^l(1-p)^{n-l}$$

where p is the bit error rate in transmission lines and l is the Hamming distance produced by $$l = b_{k,m} \oplus a_1 + \sum_{q=1}^{n-1} a_q \oplus a_{q+1}$$

where $\oplus$ indicates modulo 2 addition.

Supposing $p=10^{-2}$, $n=20$ and $l=5$ by way of example, then P is on the order of not larger than $10^{-10}$ which is quite small compared to the stability of ordinary clock synchronization systems. In this case, therefore, the coincidence pulse appeared in the window may be regarded to indicate the frame position almost for certain.

However, in digital audio systems and the like, framing patterns with low code transition frequencies are often selected to lower the band of codes and thereby set up a lowest possible system operating frequency. Particularly, compact disc players belonging to digital audio systems are designed with $n=22$, $a_1=a_2=\ldots a_{11}=1$ and $a_{12}=a_{13}=\ldots a_{22}=0$. For these values, the Hamming distance l is $$l = b_{k,m} \oplus a_1 + 1$$

Then, if $b_{k,m}$ and $a_1$ are common in sign, $l=1$ so that the probability P exceeds the stability of the clock synchronization system. It follows that the prior art framing system, which always regards a coincidence pulse appeared in the window as indicating a correct frame position and resets a frame counter each such time, cannot avoid noticeable deterioration to its characteristics due to the occurrence of random errors.

Further, while the window in the prior art method may be made larger in order to achieve stable framing against fluctuation in clock phase, it serves to proportionally reduces the forward protection function against random errors.

The present invention has been elaborated to overcome the drawbacks inherent in the prior art framing system as discussed hereinabove. In principle the present invention pays attension to the special characteristics of framing patterns and, when a coincidence pulse is found at a position different from the present frame position within a window, regards frame information as having been lost at that instant and causes the system into a hunting state to search a new frame position.

SUMMARY OF THE INVENTION

It is an object of the present invention to provide a framing system which is capable of lowering the frequency of misframing due to random errors and of quickly following true misframing.

It is another object of the present invention to provide a framing system which is free from the loss of a framing pulse or coexistence of framing pulses within one frame, which is critical in conjunction with error correction and like signal processings performed over several consecutive frames.

It is another object of the present invention to provide a generally improved framing system.

A framing system of the present invention is applicable to a digital signal having a frame which is made up of an n-bit long framing pattern and m-bit long information, and a clock period of T seconds. The system includes counter means for counting clock pulses, modulo (n+m), and generating a framing pulse every time the count reaches a predetermined value K. Correlation detector means observes an n'-bit bit pattern (n' being a positive integer not larger than n) arrived thereat up to a given instant of observation and obtains a correlation between the observed bit pattern and an n'-bit reference pattern to determine whether or not the observed pattern is coincident with the reference pattern. State control means controls the counter means in accordance with a state of the system. Means is provided for determining as a first observation time one bit time which starts at a leading end of a framing pulse appearing at every (n+m)·T seconds and defines a second observation time having a predetermined width the center of which is defined by the first observation time, each if the internal state of the state control means is an initial state. This means is constructed to reset the internal state to the initial state if an output of the correlation detector means indicates coincidence in the first observation time, and to immediately change the internal state into a hunting state under at least one of a condition wherein the output of the correlation detector means indicates uncoincidence predetermined N consecutive times in the first observation time and a condition wherein the output of the correlation detector means indicates coincidence even once in the second observation time. In the hunting state of the state control means, outputs of the correlation detector means are continuously observed and, as soon as coincidence is detected, the predetermined value K is loaded in the counter means to generate a new framing pulse.

The above and other objects, features and advantages of the present invention will become apparent from the following detailed description taken with the accompanying drawings.

DESCRIPTION OF THE PREFERRED EMBODIMENTS

While the framing system of the present invention is susceptible of numerous physical embodiments, depending upon the environment and requirements of use, substantial numbers of the herein shown and described embodiments have been made, tested and used, and all have performed in an eminently satisfactory manner.

Figure 1:
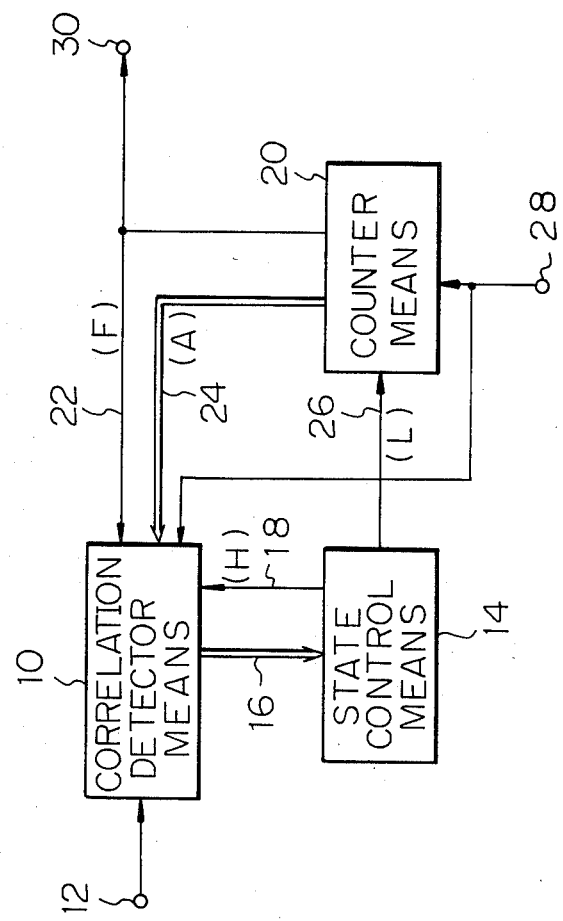
FIG. 1 is a block diagram of a hunting acceleration type framing system embodying the present invention.
Figure 2:
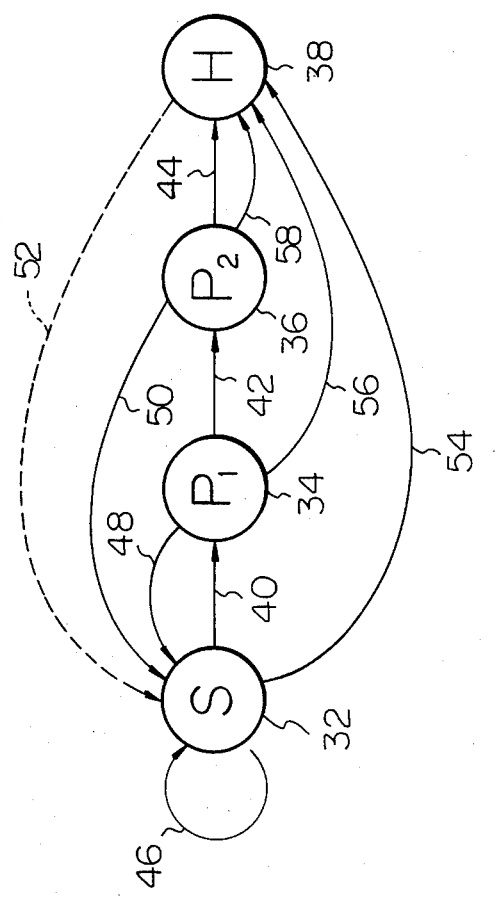
FIG. 2 is a state transition diagram representing the operation of the framing system shown in FIG. 1.

Referring to FIG. 1 of the drawings, a framing system of the present invention includes a correlation detector means 10 which is connected to a data input terminal 12. The correlation detector 10 observes a digital input pattern of n' bits (n' being a positive integer not larger than n) arrived at the input terminal 12 within a given observation time thereby determining a correlation between the incoming bit pattern and a reference pattern. The output of the correlation detector 10, indicating whether or not the actual bit pattern is coincident with the reference pattern, is fed to state control means 14 via a signal line 16. The observation time for the correlation detector 10 is determined by a hunting command signal (H signal) supplied from the state control 14 via a signal line 18, frame pulses (F signal) supplied from counter means 20 via a signal line 20, and a count signal (A signal) supplied from the counter means 22 via a signal line 24. That is, while the H signal is (logical) "0" (meaning that the hunting command is absent), a time corresponding to one bit and determined by the F signal is employed as a first observation time, and a time corresponding to several bits before and after the F signal provided by the combination of A and F signals, i.e., a window, is employed as a second observation time. The first and second observation times do not overlap each other. As the correlation detector 10 detects a coincidence within the first observation time, its output is fed over the line 16 to the state control 14 to immediately reset the internal state of the latter into a start state (S state) (see FIG. 2). When a coincidence is found within the second observation time, the output of the correlation detector 10 actuates the state control 14 into a hunting state (H state) by way of the line 16. When the correlation detector 10 detects an uncoincidence within the first observation time, it changes the internal state of the state control 14 via the line 16 and this transition of the internal state depends on the number of uncoincidences which arrived after the S state. Supposing the frequency of forward protection is three, the internal state makes a transition to a state $P_1$ as shown in FIG. 2 in response to one uncoincidence after the state S and, then, to a state $P_2$ in response to another uncoincidence. As a further uncoinidence arrives in the state $P_2$, the internal state becomes H. Upon the transition to the state H, the correlation detector 10 is supplied with the H signal via the line 18 which is "1". As soon as the H signal becomes "1", the correlation detector 10 tries a coincidence detection employing all the bit timing times as observation times. If a coincidence is detected, the state control 14 has its internal state reset to the S state via the line 16 and, at the same time, delivers a load command (L signal) of predetermined several K's to the counter means 20 over a signal line 26 commanding it to generate a framing pulse at the instant that the coincidence has been detected. The counter means 22 is adapted to constantly count one frame of clock pulses. In FIG. 1, the reference numeral 28 designates a clock input terminal and 30, an output terminal.

The internal state of the state control 14 undergoes transitions as illustrated in FIG. 2. The states S, $P_1$, $P_2$ and H previously mentioned are designated by the reference numerals 32, 34, 36 and 38, respectively. Denoted by the reference numerals 40, 42 and 44 are the transitions which occur in response to the detection of an uncoincidence in the first observation time. Further, the reference numerals 46, 48 and 50 designate transitions which occur in response to the detection of a coincidence in the first observation time. When a coincidence is detected in the hunting state, the internal state returns to the S state as indicated by the reference numeral 52. Transitions designated 54, 56 and 58 correspond to transitions which will result from the detection of a coincidence in the second observation time, that is, during observation through the window. It will be seen from FIG. 2 that the coincidence detection in the window contributes to the acceleration of hunting.

Figure 3:
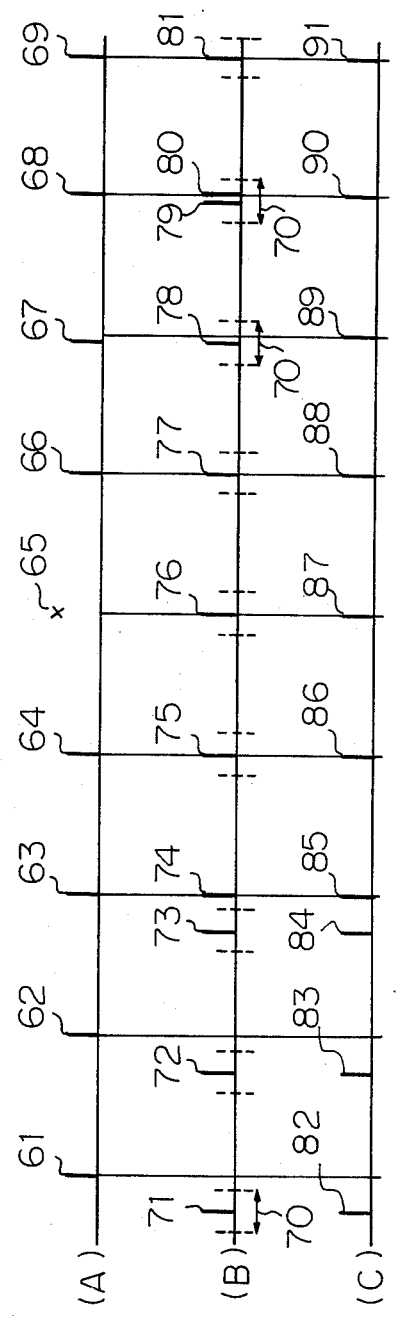
FIG. 3 is a waveform diagram also representing the operation of the framing system shown in FIG. 1.

Referring to FIG. 3, the waveforms demonstrates a difference between the prior art framing system and that of the present invention with respect to the resistivity to random errors. A waveform (A) in FIG. 3 indicates coincidence pulses provided by the correlation detector 10: pulses 61–66 appear regularly timed to frame synchronization, a pulse is missing due to a random error at the position of a pulse 65, a pulse 67 appears ahead of its expected position due to a random error, and pulses 68 and 69 are generated again at regular positions.

The prior art framing system will be discussed first. A waveform (B) in FIG. 3 shows framing pulses. Suppose that a framing pulse 71 indicative of a presently presumed frame position has appeared in the illustrated position. In this situation, observation is made to see if a coincidence pulse is positioned within a window 70 which extends over several bits before and after the pulse 71. In the illustrated example, no coincidence pulse is found within the window 70. When such a state has continued over the frequency of forward protection (three times in this particular example), hunting is initiated and a framing pulse 74 is generated upon detection of the coincidence pulse 63 and, then, the hunting is terminated. Thereafter, framing pulses 75, 76 and 77 are regularly generated each at the frame period. Even though the coincidence pulse may be lost due to a random error as at 65, such does not effect the framing pulse by virtue of the forward protection. However, once a coincidence pulse 67 appears at a position deviated from its correct position and within the window 70 due to a random error, it shifts a framing pulse 78 and the next framing pulse 79 is generated with reference to the deviated frame pulse 78. At this instant, because the coincidence pulse 68 appeared at the correct position necessarily enters the window 70, the frame position becomes renewed as indicated by a pulse 80 and, thereafter, a framing pulse will be generated at each frame period. Thus, when a coincidence pulse is deviated from the correct position due to a random error as at 67, misframe occurs over two successive frames. The prior art framing system, therefore, cannot effect the forward protection function against the generation of a coincidence pulse which may appear in the window 70 due to a random error.

The hunting acceleration type framing system of the present invention proceeds in the same manner as the prior art system concerning framing pulses 82 to 88, as represented by a waveform (C) in FIG. 3. The difference is that the system of the invention starts hunting immediately after a coincidence pulse, like the coincidence pulse 67, appears at an incorrect timing due to a random error. Because the next coincidence pulse 68 is in the correct frame position, resulting pulses 89, 90 and 91 will keep correct frame positions as illustrated.

When a coincidence pulse has appeared unexpectedly at an incorrect timing due not to a random error but to a true bit deviation, it is necessary to follow a new frame position as soon as possible. In this respect, the prior art framing system may be somewhat advantageous over that of the present invention. Still, taking into account the fact that in practical systems the influence of random errors is often predominant and, moreover, the frequency with which incorrect coincidence pulses appear due to random errors is increased in the situation causative of the true bit deviation, the hunting acceleration type framing system of the invention is generally superior in practical systems to the prior art concerning the synchronizing characteristics.

Figure 4:
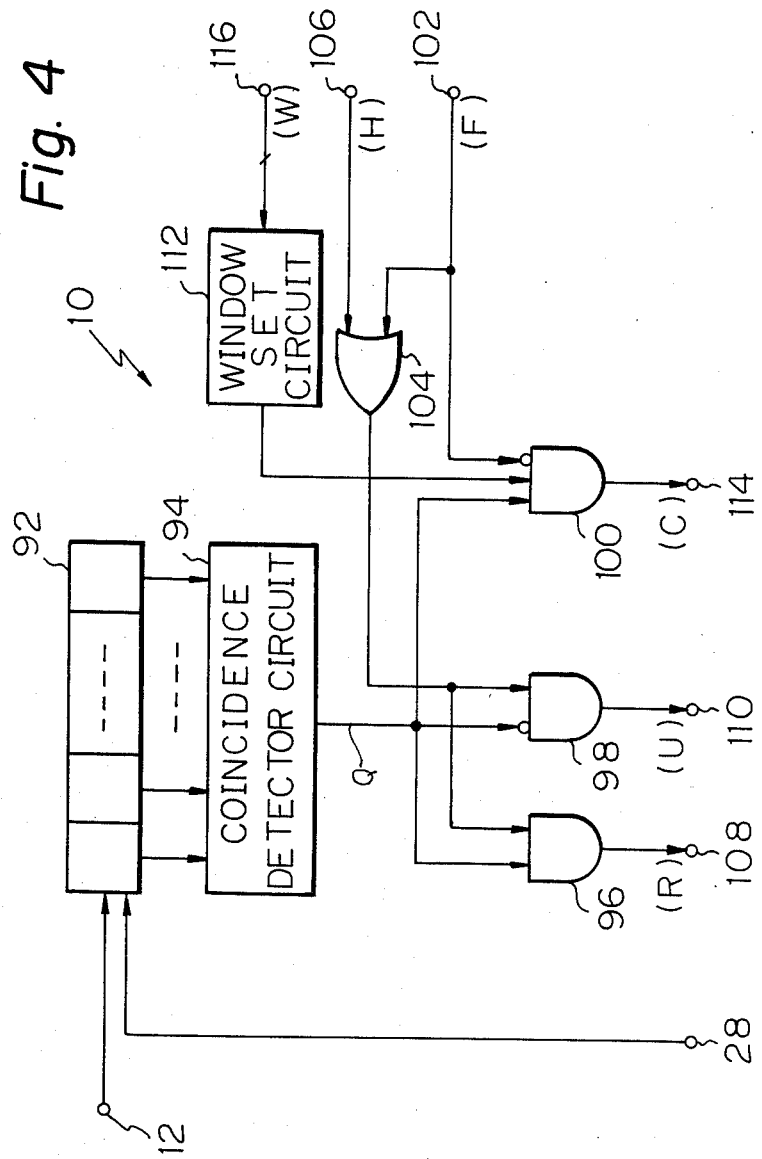
FIG. 4 is a circuit diagram of correlation detector means applicable to the framing system of FIG. 1.

Referring to FIG. 4, a practical construction of the correlation detector means 10 is illustrated. As shown, a binary signal coming in through the input terminal 12 is loaded bit by bit into a serial-input parallel-output register 92 in response to clock pulses, which are supplied to the register 92 from the clock input terminal 28. The output of the register 92, which is an n'-bit parallel pattern, is compared with an n'-bit reference pattern by a coincidence detect circuit 94. The output of the coincidence detector 94, designated Q in FIG. 4, will be "1" if the compared two patterns are coincident and "0" if not. The signal Q is supplied to AND gates 96 and 100 while a reflected version $\bar{Q}$ of the signal Q is supplied to an AND gate 98. Each of the AND gates 96 and 98 is controlled by a framing pulse (F signal) fed from a terminal 102 through an OR gate 104 and a hunting command signal (H signal) fed from a terminal 106. With this construction, the correlation detector 10 will produce at an output terminal 108 a coincidence pulse (R signal) which has been detected during a "1" period of the F or H signal and, at an output terminal 110, an uncoincidence pulse (U signal) detected during the same period. The AND gate 100, on the other hand, gates the output Q of the coincidence detector 94 within a period of time determined by a window set circuit 112 and when a framing pulse is absent, delivering the Q signal to an output terminal 114. This signal at the terminal 114 will be called the C signal hereinafter. The window set circuit 112 sees a count output from the counter means 20 (corresponding to the previously mentioned A signal) and sets a window by making its output "1" only when the count lies within a predetermined range.

Figure 5:
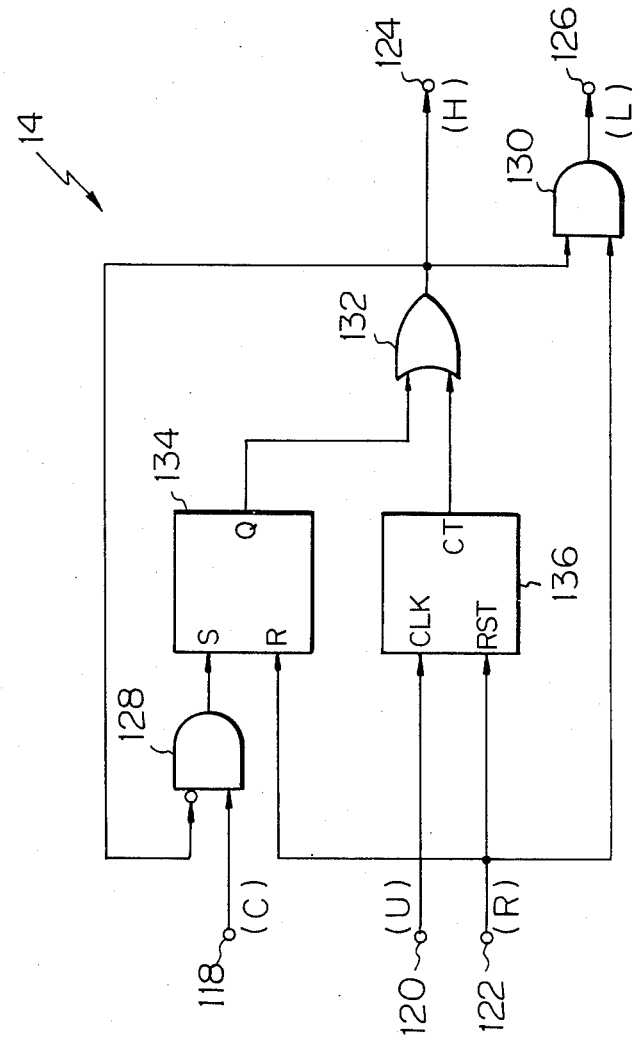
FIG. 5 is a circuit diagram of state control means also application to the system of FIG. 1.

Referring to FIG. 5, there is shown a practical example of the state control 14. The state control 14 includes an input terminal 118 for the C signal, an input terminal 120 for the U signal and an input terminal 122 for the R signal, an output terminal 124 for the H signal, and an output terminal 126 for a load command (L signal) which will force the counter means 22 to load a predetermined count therein. The state control 14 also includes AND gates 128 and 130, an OR gate 132, a set-reset type flip-flop 134 and a counter 136.

In FIG. 5, the counter 136 normally counts the U signal or uncoincidence pulses and is reset by the R signal or coincidence pulses. When the flip-flop 134 is set by the C signal or coincidence pulse in the window to invert its output level to the high or when the counter 136 reaches a predetermined count (which corresponds to the frequency of forward protection) to invert its output level to the high, the H signal output from the OR gate 132 is immediately made high level so that a hunting command is delivered to the correlation detector 10. At this instant, the C signal is inhibited by the AND gate 128 to cause the flip-flop 134 to wait until reset by the R signal. That is, upon entry of a coincidence pulse under the hunting state as the R signal, both the flip-flop 134 and counter 136 are reset to return the system to the initial state. Meanwhile, the L signal appearing as an output of the AND gate 130 upon detection of a coincidence pulse during hunting changes its level from the low to the high.

As described above, the framing system in accordance with the first embodiment is successful to reduce the frequency of misframing due to random errors while smoothly following true misframing.

The embodiment described above prevents a framing pulse from being lost within one frame period. Still, it cannot entirely eliminate the possibility of two framing pulses appearing temporarily in one frame during a transition from the hunting state. Should two framing pulses occur within one frame, critical decode errors would be invited in, for example, a system which performs error correction over several successive frames. This will be discussed supposing the first frame, second frame . . . , "k" frame, . . . arriving in this order and a system which corrects an error by checking the code correlation over five out of the successive frames at a time. The information available for this system to see the head positions of the frames is only the framing pulses. For example, if two framing pulses are generated in the period of the fourth frame, the data in the fourth frame out of the first to the fifth will be broken off midway and the system will regard the data from that instant to the end of the fourth frame as belonging to the fifth frame. This situation continues itself even to the next timing. As a result, while the data in the second and third frames are normally input, those regarded as the data in the fourth, fifth and sixth frames become quite different from the true data. In this manner, the appearance of two frame pulses in one frame would render error correction impossible over a set of five frames which is necessary for determining a correlation between codes.

Figure 6:
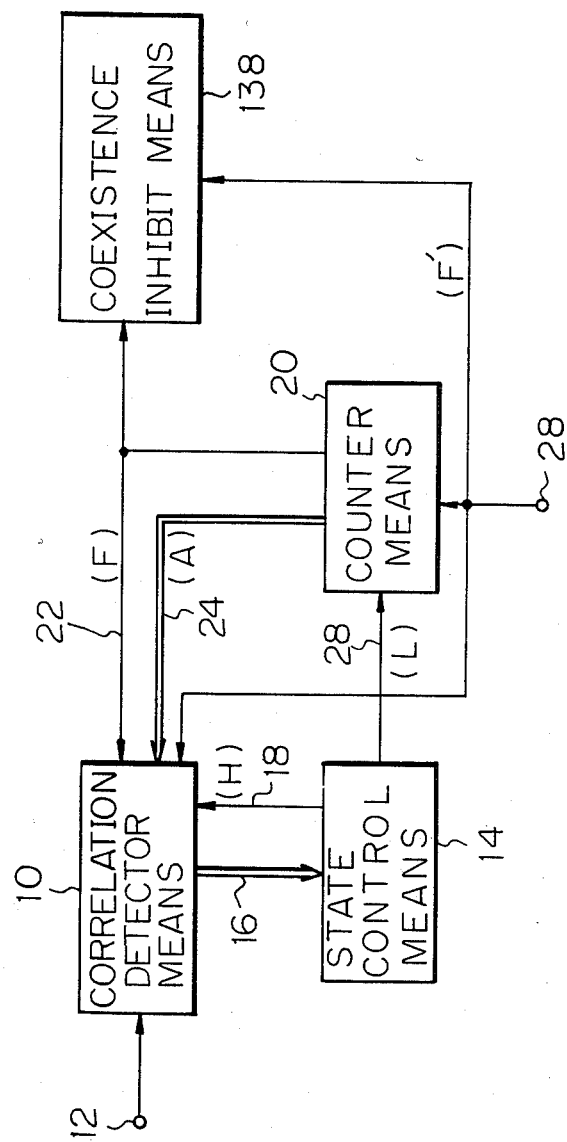
FIG. 6 is a block diagram of another embodiment of the present invention.

Referring to FIG. 6, a second embodiment of the present invention designed to overcome the above drawback is illustrated in block diagram. This embodiment is distinguished from the first embodiment by the presence of a coexistence inhibit means 138. Temporary frame pulses F' output from the counter means 22 will never be lost but may coexist within half a frame. In accordance with this embodiment, the temporary frame pulses F' are introduced into the coexistence inhibit means 138 so that upon occurrence of two pulses in half a frame, only leading one of the pulses is picked up and transformed into a correct frame pulse. The inhibit means 138 may conveniently be provided with a construction shown in FIG. 7 by way of example.

Figure 7:
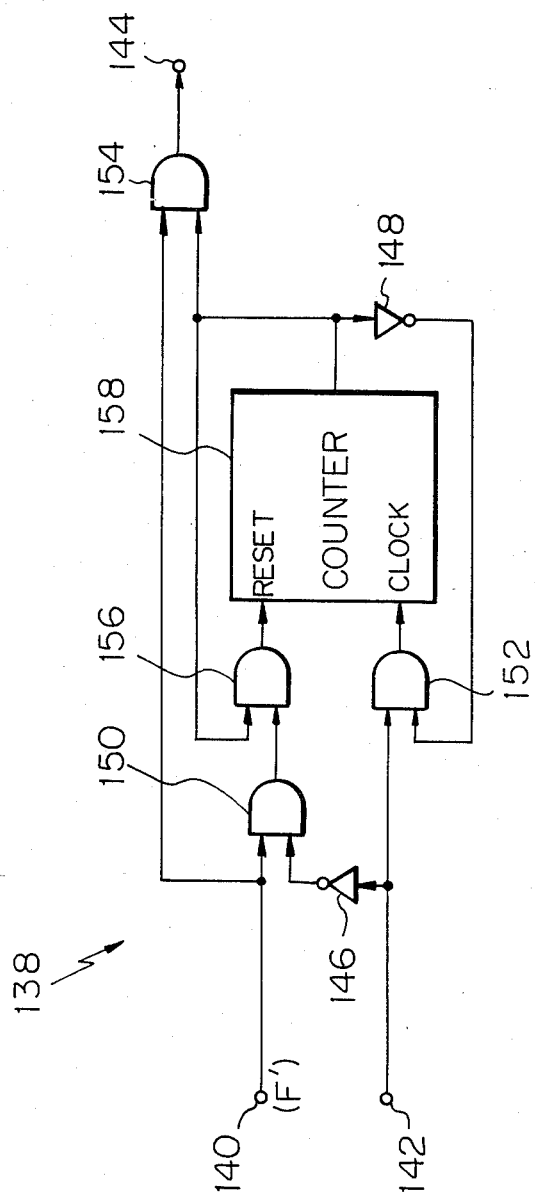
FIG. 7 is a circuit diagram of coexistence inhibit means applicable to the system shown in FIG. 6.
Figures 8A, 8B, 8C, 8D, 8E:
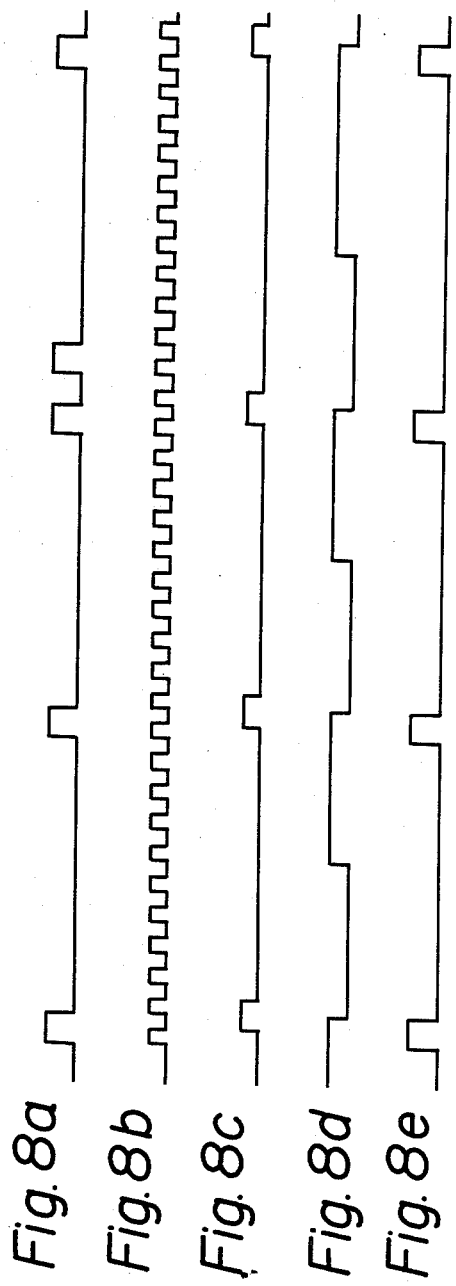
FIGS. 8a–8e are waveform diagrams representing the operation of the circuit shown in FIG. 7.

In FIG. 7, the coexistence inhibit means 138 comprises an input terminal 140 for the temporary frame pulses, an input terminal 142 for clock pulses and an output terminal 144 for correct frame pulses. It also comprises inverters 146 and 148, AND gates 150, 152, 154 and 156, and a counter 158 for counting clock pulses within half a frame. Suppose that temporary frame pulses have arrived at the input terminal 140 as shown in FIG. 8a, and that clock pulses have been supplied to the input terminal 142 as shown in FIG. 8b. Then, the output level of the AND gate 156 will be varied as shown in FIG. 8c, thereby resetting the counter 158. When reset, the counter 158 begins counting the input clock pulses and, upon counting half a frame of clock pulses, inverts its output level to the high as indicated in FIG. 8d. For this half a frame, therefore, the reset signal is not fed to the counter 158. Obtaining AND of the output of the counter 158 and the temporary frame pulses will allow a correct frame pulse to appear at the output terminal 144 without any missing pulse or coexisting pulses.

It will be seen from the above that the second embodiment of the present invention realizes a framing system which desirably operates without loosing a pulse or allowing two pulses to coexist even under poor ambient conditions.

Various modifications will become possible for those skilled in the art after receiving the teachings of the present disclosure without departing from the scope thereof.

What is claimed is:

1. A framing system for a digital signal having a frame which is made up of an n-bit long framing pattern and m-bit long information and a clock period of T seconds, said framing system comprising:
    counter means for counting clock pulses, modulo (n+m), and generating a framing pulse every time the count reaches a predetermined value K;
    correlation detector means for observing an n'-bit bit pattern (n' being a positive integer not larger than n) arrived thereat up to a given instant of observation and obtaining a correlation between the observed bit pattern and an n'-bit reference pattern to determine whether or not the observed pattern is coincident with the reference pattern; and
    state control means for controlling said counter means in accordance with a state of the system, said state control means including first means for determining as a first observation time one bit time which starts at a leading end of a framing pulse appearing at every (n+m) T seconds, and defining a second observation time having a predetermined width the center of which is defined by the first observation time, second means for resetting an internal state of state control means to the initial state if an output of the correlation detector means indicates coincidence in the first observation time, third means for changing the internal state into a hunting state under at least one of a condition wherein the output of the correlation detector means indicates uncoicidence predetermined N consecutive times in the first observation time and a condition wherein the output of the correlation detector means indicates coincidence even once in the second observation time, and fourth means for continuously observing the output of the correlation detector means in the hunting state of the state control means and loading the predetermined value K in the counter means to generate a new framing pulse upon detection of coincidence by the correlation detector means.

2. A framing system as claimed in claim 1, in which the frame pulses are temporary frame pulses, the system further comprising coexistence inhibit means for inhibiting succeeding one of two temporary pulses when the two temporary pulses coexist within half a frame, whereby only one frame pulse appears in every frame period.

3. A framing system for a digital signal having repetitive frames each including a framing pattern, said system including detection means for detecting coincidence between said framing pattern and a reference pattern, said system being operable in a normal mode wherein the output of said detection means is enabled during a first time interval during each frame with detected coincidence between said framing pattern and reference pattern during said first time interval representing proper frame synchronization, said system being further operable in a search mode wherein the output of said detection means is enabled during a third time interval, longer than said first time interval, in order to recover proper frame synchronization, said system including:
    first means for enabling said output of said detection means during said first time interval, with detected coincidence during said first observation time interval indicating proper synchronization;
    second means for enabling said output of said detection means during a second time interval, adjacent but not overlapping said first time interval, detected coincidence between said digital signal and reference pattern during said second time interval indicating improper synchronization; and
    control means for switching said framing system to said search mode in response to deteted coincidence during said second time interval.

* * * * *